US012781570B2

(12) United States Patent
Balbach et al.

(10) Patent No.: US 12,781,570 B2
(45) Date of Patent: Nov. 3, 2026

(54) MANUAL RELEASE STRUCTURE AND ROLL-UP DOOR ASSEMBLY

(71) Applicant: ASI Doors, Inc., Milwaukee, WI (US)

(72) Inventors: George F. Balbach, Lake Bluff, IL (US); Jonathon M. Haggerty, Whitefish Bay, WI (US)

(73) Assignee: ASI Doors, Inc., Milwaukee, WI (US)

( * ) Notice: Subject to any disclaimer, the term of this patent is extended or adjusted under 35 U.S.C. 154(b) by 207 days.

(21) Appl. No.: 18/667,368

(22) Filed: May 17, 2024

(65) Prior Publication Data

US 2024/0384594 A1 Nov. 21, 2024

Related U.S. Application Data

(60) Provisional application No. 63/467,391, filed on May 18, 2023.

(51) Int. Cl.
*E06B 9/58* (2006.01)

(52) U.S. Cl.
CPC ........ *E06B 9/581* (2013.01); *E06B 2009/585* (2013.01)

(58) Field of Classification Search
CPC ............... E06B 9/581; E06B 2009/585; E06B 2009/588; E06B 9/58; E06B 9/56
See application file for complete search history.

(56) References Cited

U.S. PATENT DOCUMENTS

| | | | | |
|---|---|---|---|---|
| 1,694,314 | A | 12/1928 | Dixson | |
| 4,478,268 | A | 10/1984 | Palmer | |
| 5,141,044 | A | 8/1992 | Hying | |
| 6,962,188 | B2 | 11/2005 | Coenraets | |
| 7,748,431 | B2 * | 7/2010 | Jansen | E06B 9/13 160/264 |
| 8,109,317 | B2 * | 2/2012 | Bostyn | E06B 9/581 160/271 |
| 2016/0160492 | A1 * | 6/2016 | Gower | E04B 1/388 52/202 |
| 2024/0384593 | A1 * | 11/2024 | Balbach | E06B 9/58 |

FOREIGN PATENT DOCUMENTS

| | | | | |
|---|---|---|---|---|
| CN | 210714404 | U | 6/2020 | |
| CN | 215169587 | U | 12/2021 | |
| FR | 2954396 | A1 | 6/2011 | |
| FR | 3048014 | A1 * | 8/2017 | E06B 9/13 |
| GB | 2471198 | A * | 12/2010 | E06B 9/58 |
| JP | 5138562 | B2 | 2/2013 | |
| KR | 102263989 | B1 * | 6/2021 | E06B 9/171 |

OTHER PUBLICATIONS

Machine translation FR3048014 (Year: 2017).*
Machine translation KR102263989 (Year: 2021).*

* cited by examiner

*Primary Examiner* — Marcus Menezes
*Assistant Examiner* — Jeremy C Ramsey
(74) *Attorney, Agent, or Firm* — Amundsen Davis, LLC

(57) ABSTRACT

A manual release structure and roll-up door assembly allows the edges of the roll-up door to be intentionally disengaged from the guideway when release of the door edge becomes necessary. This is accomplished by using modified roll-up door elements at the edges of the door. One modification is made to the rail within which the door edges reside when the door is in its down or "closed" position. Another modification is made to a face frame slide within which the rail resides. Still another modification is made to the edges of the roll-up door.

14 Claims, 6 Drawing Sheets

MANUAL RELEASE STRUCTURE AND ROLL-UP DOOR ASSEMBLY

This application claims the benefit of and priority to U.S. Provisional Patent Application No. 63/467,391 filed on May 18, 2023.

FIELD OF THE INVENTION

The present invention relates generally to roll-up doors of the type that are used to quickly roll up a flexible door to provide access to a bay or other opening and to then quickly roll the door back down to close off such access to the bay or other opening as is desired or required. This invention also relates to flexible doors made of cloth, multi-filament PVC coated curtain material and the like. Quick opening and closing action of the flexible roll-up door is required in applications where dust is intended to be kept out of an area or where cold air is intended to be kept in an area of a facility, for example. In clean rooms of processing facilities, the interior of the facility can be pressurized above ambient such that, when the flexible roll-up door is raised, air will flow out of the bay or opening and the door can be quickly closed without any dust or contaminant entering the bay or opening. The invention also relates to such roll-up doors that have flexible side edges disposed to each side of a central portion of the door, such edges engaging guideways that provide a path for optimal performance of the roll-up door, such guideways likewise being disposed to each side of the door. Most significantly, the present invention relates to a manual release structure disposed along the edge of the roll-up door to allow for manual release and safety should the door be unable to be raised due to a power outage or a malfunction of the roll-up mechanism for the door.

BACKGROUND OF THE INVENTION

The proper operation and functionality of a flexible roll-up door depends primarily on the flexible edges of the roll-up door that engage the guideways and remain in the guideways during opening and closing cycles. In the event that a door is down or "closed" and also inoperable, it may also be necessary for personnel be able to pass beyond the door. In point of fact, intentional disengagement is one goal of the present invention. If the roll-up door becomes inoperable due to electric or mechanical incident, the doorway is still a point of manual release if personnel are required to get through the doorway for one reason or another. Prior art suggests providing exit points within the door panel itself are typically actuated by using zippers, hook and loop construction, or other structure that requires the extricating personnel to actuate. There are, however, shortcomings to this type of closure construction. For example, and in all such exit actuation applications, the actuation means must be reversed manually such that the door can be rolled up again. Further, and in situations where the roll-up door requires the use of integrated flexible windows, vision can be partially impaired by the use of such exit actuation means.

SUMMARY OF THE INVENTION

It is to be understood that the roll-up door of the type that can be used in accordance with the release structure and assembly of the present invention may be a one-piece unitary structure made of a single material. It may also be a multiple unit configuration wherein the flexible door edges are made of one material and are attached to each side of a flexible center portion made of another material. The flexible center portion may also include opaque and transparent sections such that a user on one side of the roll-up door can visualize what is just outside or inside the other side of the door, much like a window.

In accordance with the present invention, a unique manual release structure is provided such that the edges of the roll-up door can be intentionally disengaged from the guideway. This is accomplished by using modified roll-up door elements at the edges of the door. One modification is made to the rail within which the door edges reside when the door is in its down or "closed" position. Another modification is made to a face frame slide within which the rail resides. Still another modification is made to the edges of the roll-up door. Together, these modifications result in an improved manual release structure to be used when release of the door edge becomes necessary.

The foregoing and other features of the present invention will be apparent in the detailed description that follows.

DETAILED DESCRIPTION OF THE INVENTION

Figure 1:
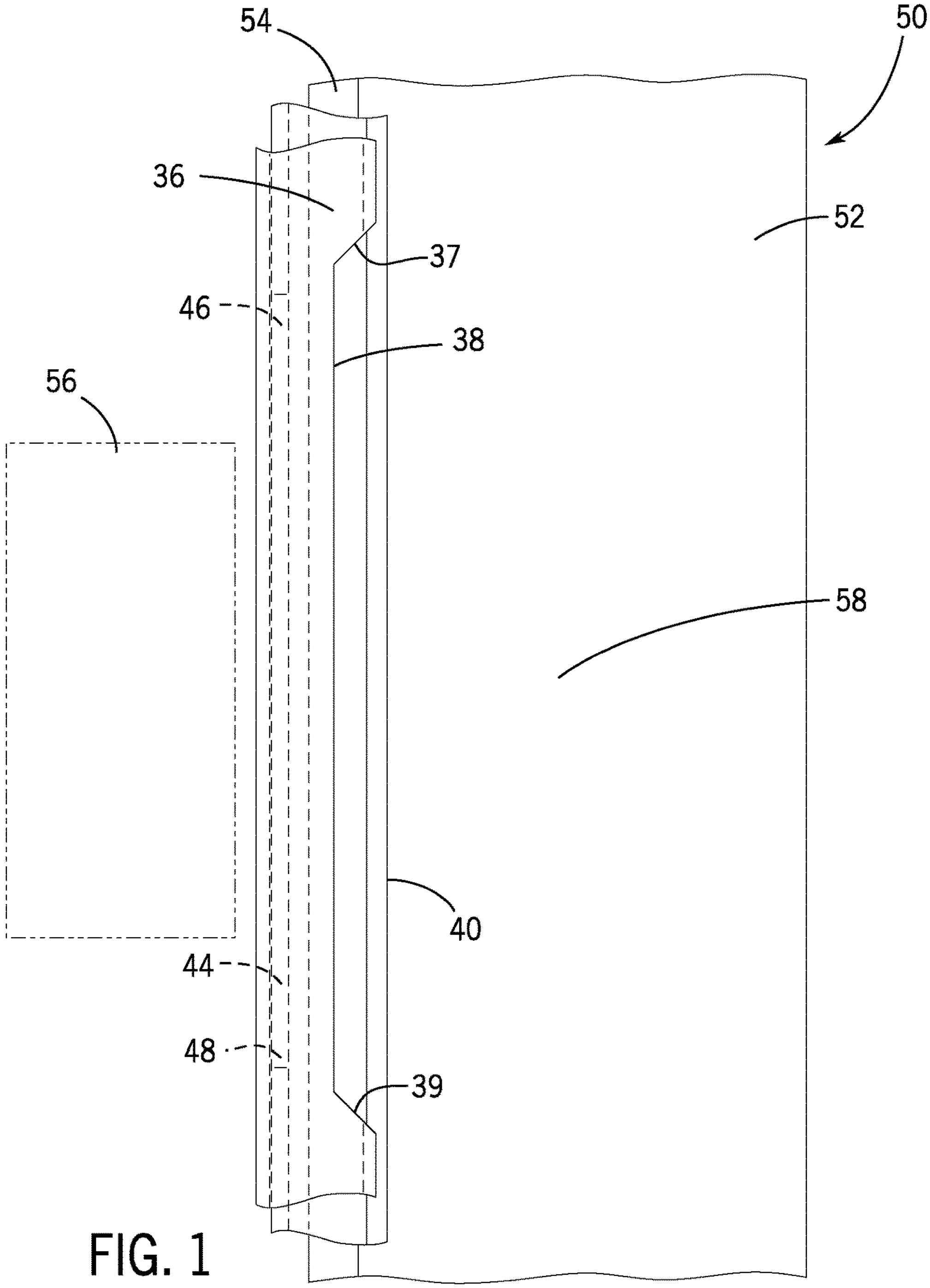
FIG. 1 is a front and partial phantom view of a length of the face frame slide, the rail, and a section of door of the type used with the manual release in accordance with the present invention.
Figure 6:
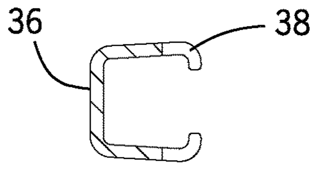
FIG. 6 is a cross-sectioned top plan view of the face frame side shown in FIG. 5 and taken along line 6-6 of FIG. 5.
Figure 9:
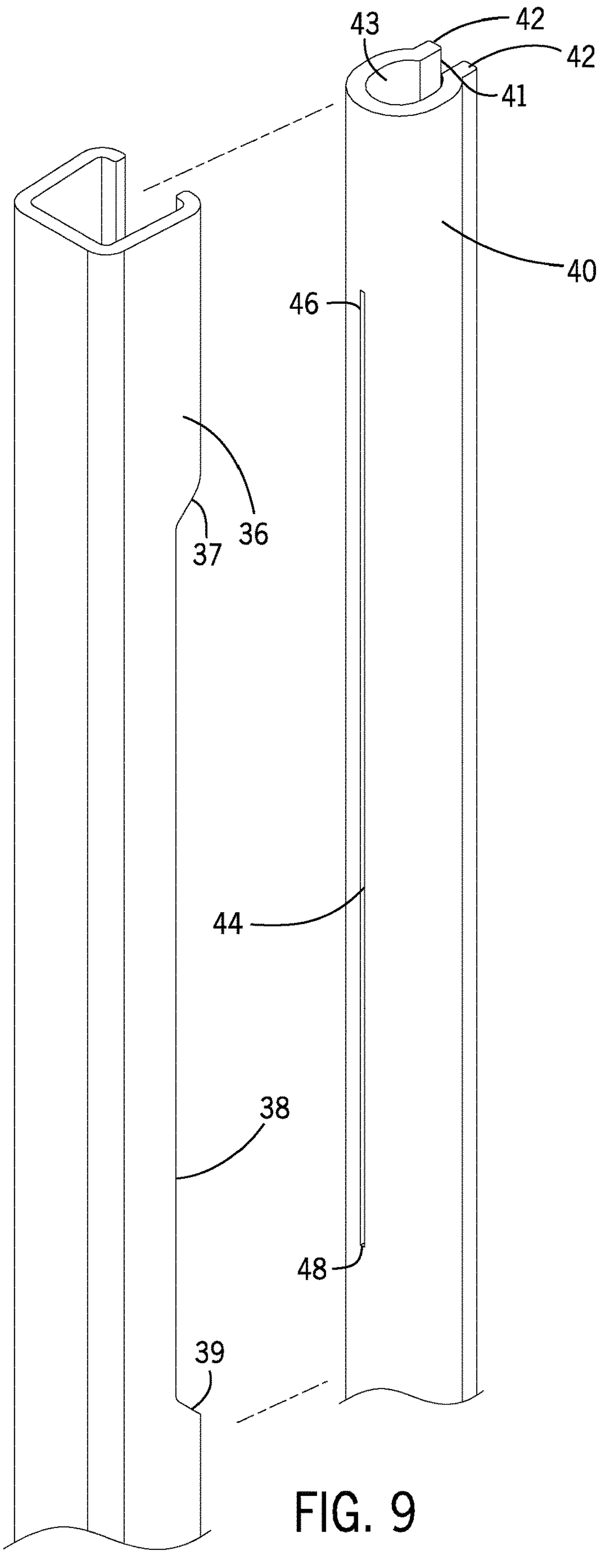
FIG. 9 is an enlarged and exploded view of the rail and the face frame side showing a single slit in the rail.

Referring now to the drawings in detail, wherein like-numbered elements refer to like elements throughout, FIG. 1 partially illustrates a manual release structure and roll-up door of the type that is constructed in accordance with the present invention. A wall clip (partially shown) is anchored to a wall (not shown), such wall being disposed to one side of the doorway or opening. The wall clip comprises a body 32. See FIGS. 2 and 6. Disposed within the body 32 is a face frame slide 36 which further houses a rail 40, the slide 36 having a pair of inwardly extending protrusions 35. See FIGS. 2, 4, 9 and 10. The body 32 of the wall clip "captures" the face frame slide 36, the face frame slide 36 "captures" the rail 40, and the rail 40 "captures" the edge 54 of the roll-up door 50 within a longitudinal retention slot 43. A longitudinal opening 41 to the retention slot 43 is flanked by a pair of longitudinal distal ends 42. See FIGS. 9 and 10. As used herein, the word "capture" has its plain and ordinary meaning.

The face frame slide 36 comprises a longitudinal notch 38 to each side of the slide 36 as shown in FIGS. 1-4. It is to be appreciated that the notch 38 is presented to each side of the slide 36 in the event extrication is required from the other side of the door 50. This notch 38 is a first aspect of the improved manual release structure and comprises a top end 37 and a bottom end 39 of the notch 38. See also FIGS. 5 and 6.

Figure 10:
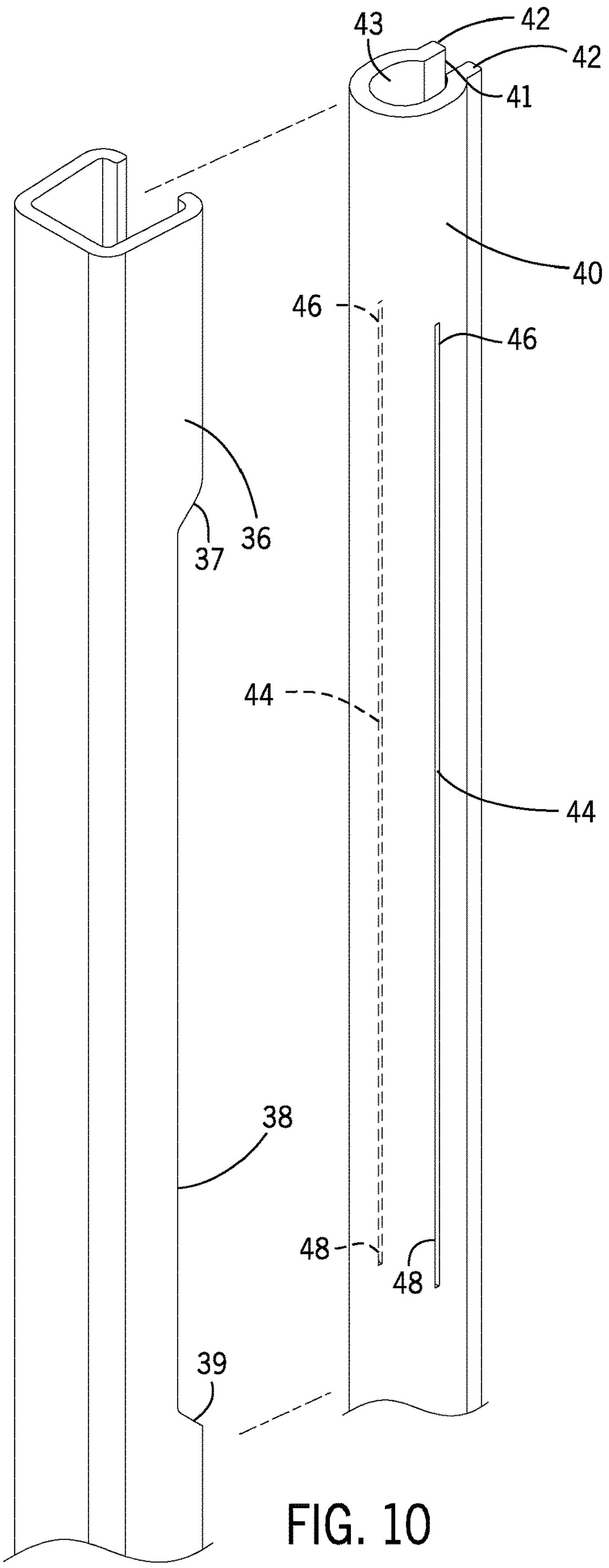
FIG. 10 is another enlarged and exploded view of the rail and the face frame side showing dual slits in the rail.
Figure 11:
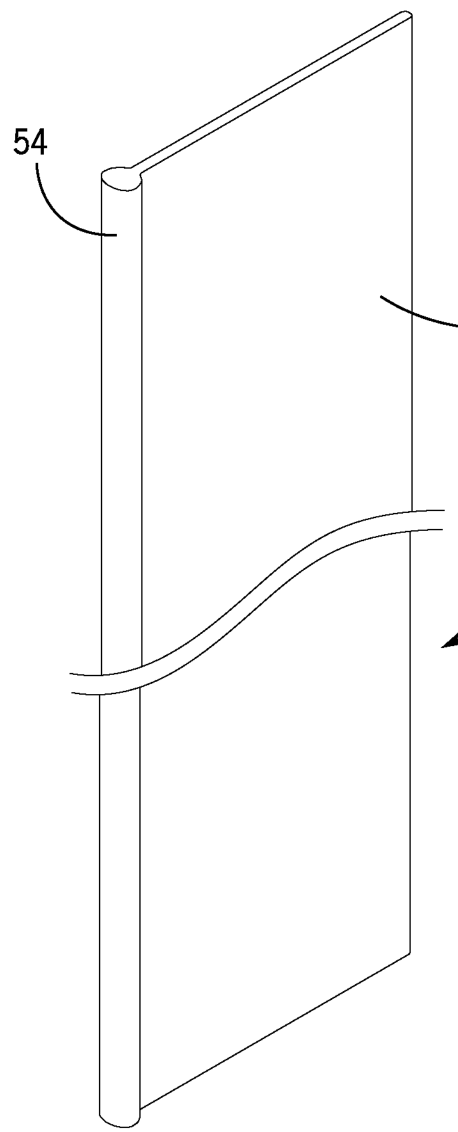
FIG. 11 is a perspective view of a portion of the door edge and central panel.
Figure 13:
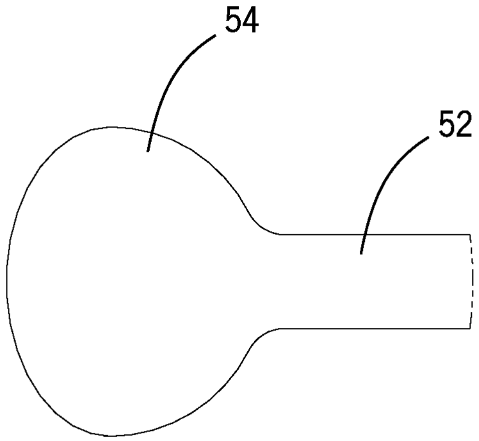
FIG. 13 is a greatly enlarged view of the side edge taken along line 13-13 of FIG. 12.
Figure 12:
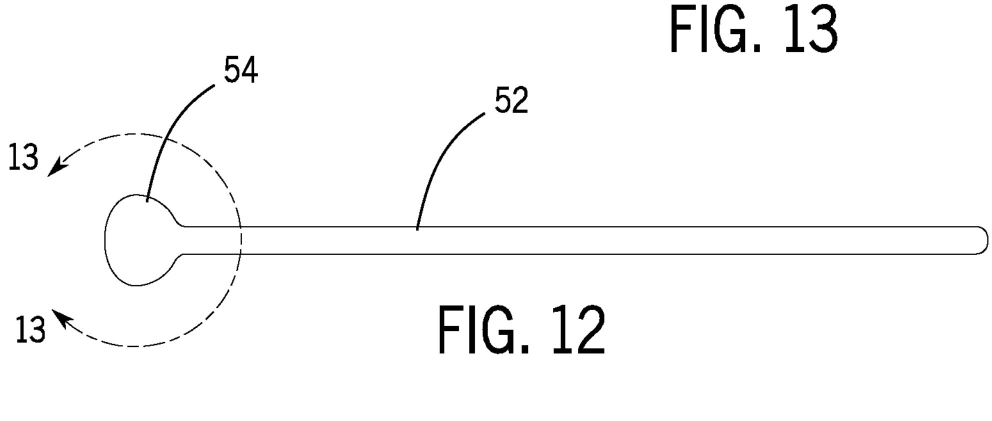
FIG. 12 is a top plan view of the roll-up door and a side edge of the roll-up door shown in FIG. 11.

An exemplar of the roll-up door 50 used in the assembly of the present invention is illustrated in FIGS. 11-13. As shown, the door 50 includes a flat sheet-like panel portion 52 that extends between two side edges 54. The roll-up door 50 comprises a unitary structure in this illustrated embodiment which includes the central door panel 52 and one of its side edges 54, the other side edge not being shown. The roll-up door 50 is preferably made of a deformable material. As shown in FIGS. 10-12, the side edge 54 (which is the same on the opposing side of the door 50) is shown to be an substantially curved shape structure. This irregular shape facilitates withdrawal of the edge 54 from the rail 40 when such is required, as will be apparent later in this detailed description. This irregularly shaped edge 54 is a second aspect of the improved manual release structure. As used herein, the construction of the word "irregular" is that the edge 54 is that the structure is without a fixed or specified boundary.

Figure 7:
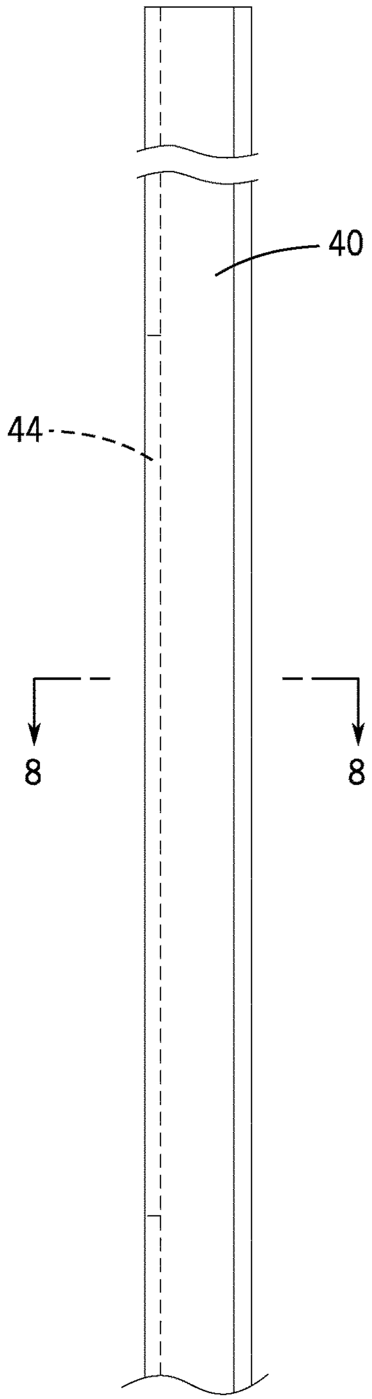
FIG. 7 is a side elevation view of a section of a portion of the rail.
Figure 8:
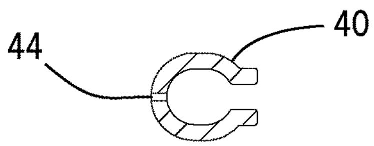
FIG. 8 is a crossed-sectioned top plan view of the rail shown in FIG. 7 and taken along line 8-8 of FIG. 7.

Referring now to FIG. 7, it will be appreciated that the portion of the rail 40 that is disposed at the notch 38 of the face frame slide 36 comprises one or more longitudinal slits 44 cut into it. Each slit 44 comprises a finite length and extends between a top end 46 and a bottom end 48. Further, the top end 46 and the bottom end 48 of the slits 44 are disposed generally in proximity to the top end 37 and the bottom end 39 of the notch 38, respectively. See FIG. 3. These slits 44 allow the distal ends 42 of the rail 40 to "flex" outwardly when a force is placed against the corresponding portion of the edge 54 or the door 50. See also FIGS. 7 and 8. The introduction of slits 44 to the rail 40 is a third aspect of the improved release structure. As used herein, the word "flex" has its plain and ordinary meaning.

Relative to the slit or slits 44 cut into the rail 40, the present invention contemplates that the position and sizing of the slits be variable. By providing this size and location variability, the amount of force that needs to be applied to the door edge 54 to release it from the rail 40 is also variable. In other words, the amount of force that needs to be applied at the release point (the location of which is indicated by the indicator 56 applied to the outside of the doorway or directly on the door 50 at a point 58, as per FIGS. 1 and 3) can be "adjusted" by changing the number, shape, orientation, and location of the slits 44 that are cut into the rail 40. FIGS. 2 and 8-10 show alternate locations for making one or more slits 44 in the rail 40. The slits 44 are shown to extend longitudinally along the rail 40. However, the present invention is not so limited as the slits 44 can be formed transversely or even at an angle relative to the longitudinal axis of the rail 40. Another viable slit 44 would be one that is serpentine in shape. The concept behind the use of the novel slit or slits 44 is to allow for an enhanced flexing of the rail 40 at a point where such is needed. As used herein, the word "adjusted" has its plain and ordinary meaning.

In application, the door 50 starts out in its "closed" position. When a user requires access from one side of the door 50 to the other, the door 50 is easily actuated to quickly roll upwardly to provide that access. Once fully rolled up, the door 50 is in its "open" position. After the user passes through the doorway, the door 50 is actuated to quickly roll downwardly to reseal the doorway. During these two cycles, the side edge 54 of the door 50 freely passes through and is guided by the rail 40.

Figure 2:
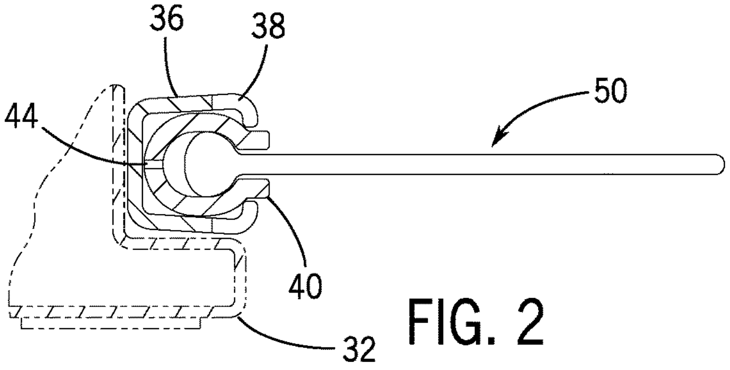
FIG. 2 is an enlarged view of a portion of the face frame slide, the rail, and a section of the door taken along line 2-2 of FIG. 1.
Figure 3:
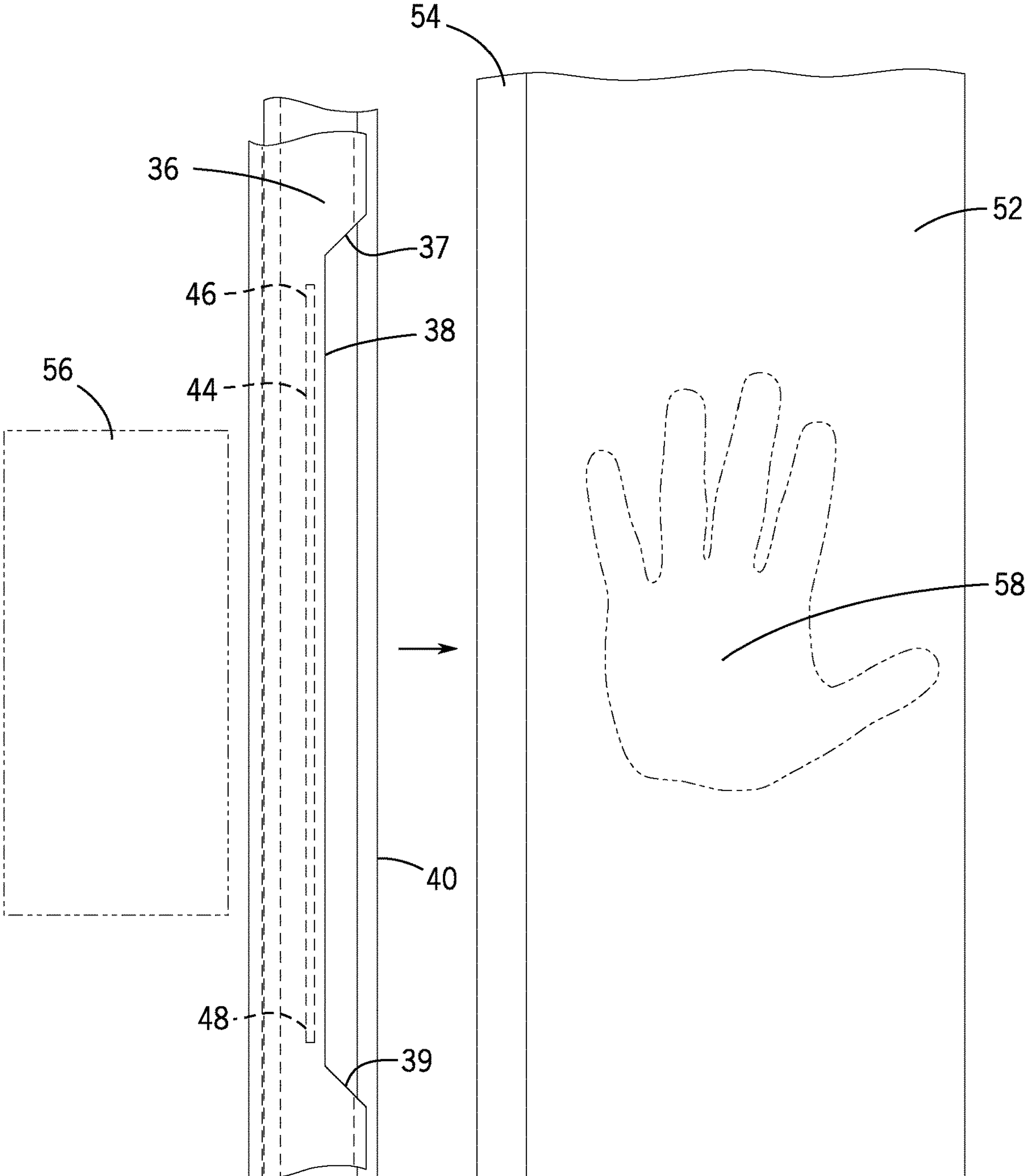
FIG. 3 is view similar to that of FIG. 1 and showing the section of door released from the face frame slide and the rail.
Figure 4:
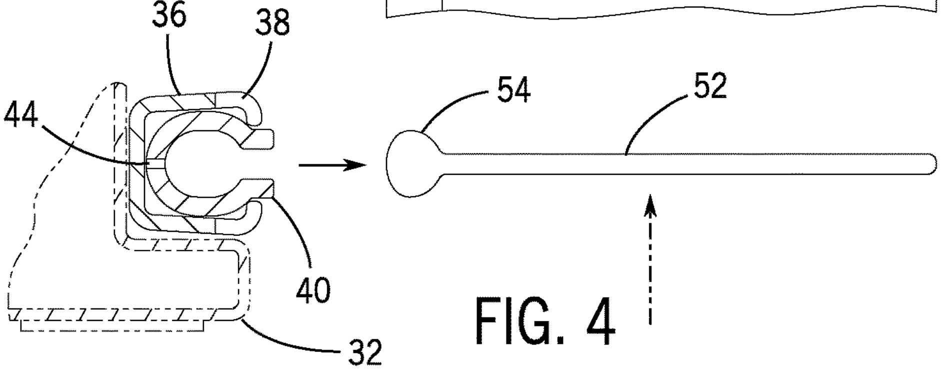
FIG. 4 is a top plan and partially sectioned view of FIG. 3.
Figure 5:
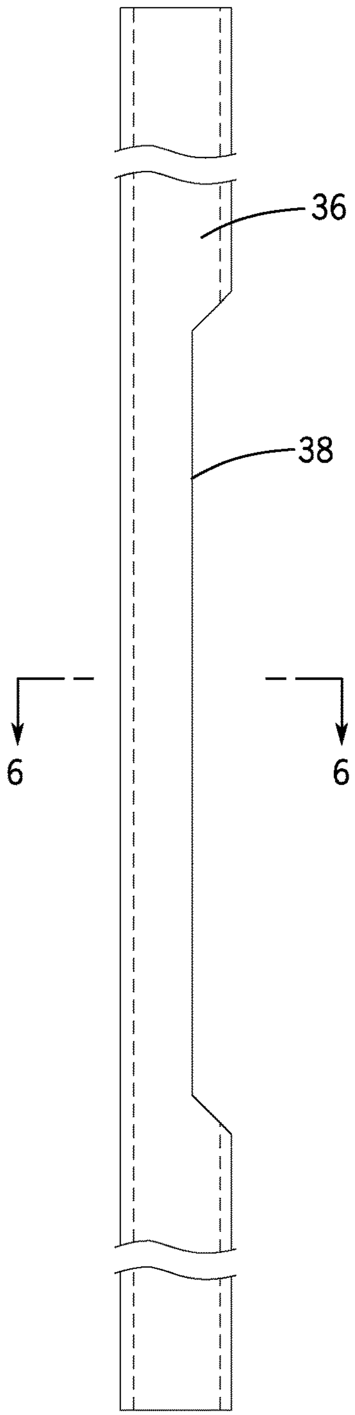
FIG. 5 is a side elevation view of a section of a portion of the face frame side.

If, while in its "closed" position, the door 50 becomes inoperable and personnel need to move through the door 50, a user can initiate a "manual" override. More specifically, and referring to FIGS. 1-4 in particular, an instructional indicator 56 is applied to the outside of the doorway or directly on the door 50 at a point 58 where the manual release structures are disposed along the wall clip. FIGS. 1 and 2 show the edge 54 of the door 50 fully engaged within the rail 40. FIG. 3 shows the outline of a hand 58 to indicate a point at which force has been applied to the door 50 such that the edge 54 of the door 50 has been displaced from the rail 40. This provides a point of extrication for the user or personnel as required. FIG. 4 illustrates this displacement of the edge 54 of the door 50 from the rail 40.

During the initial placement of force against the door 50, several things are happening. Force placed against the door 50 (which can come from either side of the door 50) initiates engagement of the door edge 54 with the distal ends 42 of the rail 40. This forces the door edge 54 to a point where the rail slit or slits 44 allow one or the other of the distal ends 42 of the rail 40 to be urged outwardly. This outward movement is facilitated by the presence of the notch 38 in the face frame slide 36. This outward movement is further facilitated by the shape of the door edge 54 itself. The irregular shape of the door edge 54 allows the door edge 54 to rotate within the rail 40, turning more quickly because the irregular shape allows the outer side of the door edge 54 to clear the opposing side of the rail 40. Once the door edge 54 has rotated sufficiently to clear that opposing side of the rail 40, the door edge 54 will be fully released at the point that the force is directed. See FIG. 4. Personnel can then pass around the door edge 54 and to the other side of the door 50.

In view of the foregoing, it will be apparent that the present invention provides a unique and novel solution for providing a manual release for use with a roll-up door 50, such release being forced at a specific point on the door itself. The amount of force is variable and adjustable depending on the number and location of the slit or slits 44 in or along the rail 40.

We claim:

1. A manual release structure for use with a roll-up door comprising:

a longitudinally and vertically extending wall clip disposed to one side of a doorway;

a longitudinally and vertically extending face frame slide captured within the wall clip, the face frame slide comprising a U-shaped structure having an opening facing inwardly of the doorway and protrusions at each side of the opening;

a rearward facing notch disposed in the face frame slide, the notch extending a length at each side of the face frame slide and the length of the notch being bound by a top end and a bottom end; and a longitudinally and vertically extending rail captured within the face frame slide opening and retained in place by the protrusions of the opening, the rail comprising a retention slot having a vertical axis, an opening to the retention slot and at least one vertical slit parallel to the axis, a length of the at least one vertical slit being bound by a top end and a bottom end;

wherein the at least one vertical slit is disposed in the rail at the face frame slide notch; and wherein the at least one slit allows the rail to flex and the opening of the rail to expand at the face frame slide notch.

2. The manual release structure of claim 1, wherein a position of the at least one slit is variable.

3. The manual release structure of claim 1, wherein the length of the at least one slit is variable.

4. A manual release structure for use with a roll-up door, the roll-up door comprising a central door panel disposed within a doorway and flanked by two lateral vertical edges, the edges having a substantially curved shape, and the manual release structure comprising:

a longitudinally and vertically extending wall clip disposed to each side of the doorway;

a longitudinally and vertically extending face frame slide captured within the wall clip, the face frame slide comprising a U-shaped structure having an opening facing inwardly of the doorway and protrusions disposed at each side of the opening;

a rearward facing notch disposed in the face frame slide, the notch extending a length at each side of the face frame slide and a length of the notch being bound by a top end and a bottom end; and a longitudinally and vertically extending flexible rail captured within the face frame slide opening and retained in place by the protrusions of the opening, the rail comprising a vertical axis, an opening and at least one vertical slit parallel to the axis, the length of the at least one vertical slit being bound by a top and a bottom end;

wherein a lateral edge of the roll-up door can be retained within and pass through the rail;

wherein the at least one vertical slit is disposed in the rail at the notch of the face frame slide; and wherein the at least one vertical slit allows the rail to flex and the opening of the rail to expand at the face frame slide notch.

5. The manual release structure of claim 4, wherein a position of the at least one vertical slit is variable.

6. The manual release structure of claim 4, wherein the length of the at least one vertical slit is variable.

7. The manual release structure of claim 4, wherein the substantially curved shape of the roll-up door edges facilitate rotation of the door edges within the rail at the notch.

8. The manual release structure of claim 7, wherein the door panel includes indicia for hand placement for releasing and opening the door edge at the notch.

9. A manual release structure and roll-up door assembly comprising: a roll-up door comprising a central door panel disposed within a doorway and flanked by two lateral vertical edges, the edges having a substantially curved shape;

a longitudinally and vertically extending wall clip disposed to each side of the doorway;

a longitudinally and vertically extending face frame slide captured within the wall clip, the face frame slide comprising a U-shaped structure having an opening facing inwardly of the doorway and protrusions disposed at each side of the opening;

a rearward facing notch disposed in the face frame slide, the notch extending a length at each side of the face frame slide, a length of the notch being bound by a top and a bottom end; and a longitudinally and vertically extending flexible rail captured within the face frame slide opening and retained in place by the protrusions of the opening, the rail comprising a vertical axis, an opening and at least one vertical slit parallel to the axis, the length of the at least one vertical slit being bound by a top and a bottom edge;

wherein a lateral edge of the roll-up door can be retained within and pass through the rail;

wherein the at least one vertical slit is disposed in the rail at the face frame slide notch;

wherein the top end of the notch is disposed in proximity to the top end of the at least one vertical slit;

wherein the bottom end of the notch is disposed in proximity to the bottom end of the at least one vertical slit; and wherein the at least one vertical slit allows the rail to flex and the opening in the rail to expand at the face frame slide notch.

10. The manual release structure and roll-up door assembly of claim 9, wherein a position of the at least one vertical slit is variable.

11. The manual release structure and roll-up door assembly of claim 9, wherein the length of the at least one vertical slit is variable.

12. The manual release structure and roll-up door assembly of claim 9, wherein the substantially curved shape of the roll-up door edge facilitates rotation of the door edge within the rail at the notch during disengagement of the door.

13. The manual release structure and roll-up door assembly of claim 9, wherein the door panel includes indicia for hand placement for releasing and opening the door edge at the notch and the at least one vertical slit.

14. The manual release structure and roll-up door assembly of claim 13, wherein force placed against the door panel indicia initiates disengagement of the door edge from the rail.

* * * * *